US010405158B2

(12) United States Patent
McCann

(10) Patent No.: US 10,405,158 B2
(45) Date of Patent: Sep. 3, 2019

(54) METHODS, SYSTEMS AND COMPUTER READABLE MEDIA FOR PROVIDING SERVICE CAPABILITY EXPOSURE FUNCTION (SCEF) AS A DIAMETER ROUTING AGENT (DRA) FEATURE

(71) Applicant: Oracle International Corporation, Redwood Shores, CA (US)

(72) Inventor: Thomas Matthew McCann, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 8 days.

(21) Appl. No.: 15/499,847

(22) Filed: Apr. 27, 2017

(65) Prior Publication Data
US 2018/0249281 A1 Aug. 30, 2018

Related U.S. Application Data

(60) Provisional application No. 62/463,893, filed on Feb. 27, 2017, provisional application No. 62/464,064, filed on Feb. 27, 2017.

(51) Int. Cl.
H04W 4/00 (2018.01)
H04W 24/08 (2009.01)
(Continued)

(52) U.S. Cl.
CPC ............... *H04W 4/70* (2018.02); *H04W 4/20* (2013.01); *H04W 8/22* (2013.01); *H04W 24/08* (2013.01);
(Continued)

(58) Field of Classification Search
None
See application file for complete search history.

(56) References Cited

U.S. PATENT DOCUMENTS 9,432,150 B2   8/2016 Jain et al.
9,467,508 B2   10/2016 Xu
(Continued)

FOREIGN PATENT DOCUMENTS

EP     3 018 946 A1   5/2016
WO   WO 2016/156549 A1   10/2016
(Continued)

OTHER PUBLICATIONS

Non-Final Office Action for U.S. Appl. No. 15/804,974 (dated May 10, 2018).
(Continued)

Primary Examiner — George C Atkins
(74) Attorney, Agent, or Firm — Jenkins, Wilson, Taylor & Hunt P.A.

(57) ABSTRACT

A system for providing a service capability exposure function (SCEF) as a Diameter routing agent (DRA) feature includes a DRA including a plurality of message processors. The system further includes a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling.

20 Claims, 12 Drawing Sheets

(51) Int. Cl.
  *H04W 8/22* (2009.01)
  *H04W 4/70* (2018.01)
  *H04W 4/20* (2018.01)
  *H04W 92/06* (2009.01)
  *H04W 88/14* (2009.01)
  *H04W 88/16* (2009.01)

(52) U.S. Cl.
  CPC ............ *H04W 88/14* (2013.01); *H04W 88/16* (2013.01); *H04W 92/06* (2013.01)

(56) References Cited

U.S. PATENT DOCUMENTS

| | | | |
|---|---|---|---|
| 9,621,450 | B2 | 4/2017 | Jeong et al. |
| 10,313,883 | B2 | 6/2019 | Krishan |
| 10,334,419 | B2 | 6/2019 | Aravamudhan et al. |
| 2012/0207113 | A1 | 8/2012 | Yoon et al. |
| 2013/0044596 | A1 | 2/2013 | Zhi et al. |
| 2013/0080782 | A1 | 3/2013 | Rajadurai et al. |
| 2013/0272247 | A1 | 10/2013 | Guo |
| 2013/0336305 | A1 | 12/2013 | Yan et al. |
| 2014/0078968 | A1 | 3/2014 | Korhonen et al. |
| 2014/0086214 | A1 | 3/2014 | Hong et al. |
| 2014/0089442 | A1 | 3/2014 | Kim et al. |
| 2014/0153391 | A1 | 6/2014 | Ludwig et al. |
| 2014/0334386 | A1 | 11/2014 | Fukumasa et al. |
| 2014/0376426 | A1 | 12/2014 | Boudreau et al. |
| 2014/0376454 | A1 | 12/2014 | Boudreau et al. |
| 2015/0036591 | A1 | 2/2015 | Cao et al. |
| 2015/0055459 | A1 | 2/2015 | Wong et al. |
| 2015/0067328 | A1 | 3/2015 | Yin |
| 2015/0111574 | A1 | 4/2015 | Fukumasa et al. |
| 2015/0256440 | A1 | 9/2015 | Jeong et al. |
| 2015/0319172 | A1 | 11/2015 | Zhang et al. |
| 2016/0007138 | A1 | 1/2016 | Palanisamy et al. |
| 2016/0007170 | A1 | 1/2016 | Vaidya et al. |
| 2016/0085594 | A1 | 3/2016 | Wang et al. |
| 2016/0142860 | A1 | 5/2016 | Kim et al. |
| 2016/0277243 | A1* | 9/2016 | Kim .................... H04L 41/0816 |
| 2016/0277530 | A1 | 9/2016 | Jung et al. |
| 2016/0337127 | A1 | 11/2016 | Schultz et al. |
| 2016/0337841 | A1 | 11/2016 | Won et al. |
| 2017/0126512 | A1 | 5/2017 | Seed et al. |
| 2017/0295557 | A1* | 10/2017 | Chamarty ......... H04W 52/0225 |
| 2017/0318570 | A1* | 11/2017 | Shaw ..................... H04L 5/0053 |
| 2017/0347283 | A1* | 11/2017 | Kodaypak ............... H04W 4/70 |
| 2018/0035351 | A1* | 2/2018 | Kodaypak ............. H04W 76/10 |
| 2018/0092133 | A1* | 3/2018 | Starsinic ................. H04W 4/08 |
| 2018/0109941 | A1 | 4/2018 | Jain et al. |
| 2018/0124544 | A1 | 5/2018 | Gupta et al. |
| 2018/0234291 | A1* | 8/2018 | Mathison ............ H04L 41/0686 |
| 2018/0241615 | A1 | 8/2018 | Livanos et al. |
| 2018/0248711 | A1 | 8/2018 | McCann |
| 2018/0249282 | A1 | 8/2018 | McCann |
| 2018/0263013 | A1 | 9/2018 | Jain et al. |
| 2019/0021121 | A1 | 1/2019 | Aravamudhan et al. |
| 2019/0058962 | A1 | 2/2019 | Aravamudhan et al. |
| 2019/0141527 | A1 | 5/2019 | Krishan |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2019/014505 | 1/2019 |
| WO | WO 2019/090270 A1 | 5/2019 |

OTHER PUBLICATIONS

Notification of Transmittal of the International Search Report and the Written Opinion of the International Searching Authority, or the Declaration for International Application No. PCT/US2018/016044 (dated Apr. 24, 2018).

Notification of Transmittal of the International Search Report and the Written Opinion of the International Searching Authority, or the Declaration for International Application No. PCT/US2018/016047 (dated Apr. 24, 2018).

Notification of Transmittal of the International Search Report and the Written Opinion of the International Searching Authority, or the Declaration for International Application No. PCT/US2018/016045 (dated Apr. 24, 2018).

"Change Request," InterDigital, Meeting ARC#25, Doc#ARC-2016-0439-TS-0026_sec5_sec6.1, pp. 1-16 (Oct. 17, 2016).

"Universal Mobile Telecommunications System (UMTS); LTE; Home Subscriber Server (HSS) diameter interfaces for interworking with packet data networks and applications (3GPP TS 29.339 version 13.3.0 Release 13),", ETSI TS 129 336 V13.3.0, pp. 1-56 (Apr. 2016).

"Routing Non-IP Data to/from Multiple UE Applications and Multiple SCS/AS's," Convida Wireless, 3FPP TSG-SA WG2 #113AH, pp. 1-6 (Feb. 2016).

Commonly-assigned, co-pending U.S. Appl. No. 15/804,974 for "Methods, Systems, and Computer Readable Media for using Authentication Validation Time Periods," (Unpublished, filed Nov. 6, 2017).

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).

Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).

"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).

"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).

"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).

"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).

"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).

"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).

"Digital cellular telecommunications system (Phase 2+) (GSM); Universal Mobile Telecommunications System (UMTS); LTE; Architecture enhancements to facilitate communications with packet data networks and applications (3GPP TS 23.682 V13.4.0 Release 13)," ETSI TS 123 682 V13.4.0, pp. 1-82 (Mar. 2016).

"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).

Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).

(56) References Cited

OTHER PUBLICATIONS

Commonly-assigned, co-pending U.S. Appl. No. 15/604,132 for "Methods, Systems and Computer Readable Media for Providing Integrated Service Capability Exposure Function (SCEF), Service Capability Server (SCS) and Application Server (AS) Services," (Unpublished, filed May 24, 2017).
"LTE;General Packet Radio Service (GPRS) enhancements for Evolved Universal Terrestrial Radio Access Network (E-UTRAN) access (3GPP TS 23.401 version 14.3.0 Release 14)," ETSI TS 123 401 V14.3.0, pp. 1-392 (May 2017).
Commonly-assigned, co-pending U.S. Appl. No. 15/608,595 for "Methods, Systems and Computer Readable Media for Providing Service Capability Exposure Function (SCEF) as a Cloud Service," (Unpublished, filed May 30, 2017).
"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).
Abu-Lebdeh et al., "A Virtual Network PaaS for 3GPP 4G and Beyond Core Network Services," pp. 1-7 (Aug. 20, 2016).
"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Functioin (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
Notice of Allowance and Fee(s) Due for U.S. Appl. No. 15/804,974 (dated Nov. 13, 2018).
Non-Final Office Action for U.S. Appl. No. 15/679,124 (dated Oct. 4, 2018).
Non-Final Office Action for U.S. Appl. No. 15/604,132 (dated Oct. 2, 2018).
Commonly-assigned, co-pending U.S. Appl. No. 16/121,203 for "Methods, Systems and Computer Readable Media for Overload and Flow Control at a Service Capability Exposure Function (SCEF)," (Unpublished, filed Sep. 4, 2018).
Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).
Commonly-assigned, co-pending U.S. Appl. No. 15/990,196 for "Methods, Systems, and Computer Readable Media for Detecting and Mitigating Effects of Abnormal Behavior of a Machine Type Communication (MTC) Device," (Unpublished, filed May 25, 2018).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
Donovan, "Diameter Routing Message Priority," RFC 7944, pp. 1-18 (Aug. 2016).
Non-Final Office Action for U.S. Appl. No. 15/608,595 (dated Jan. 8, 2019).
Non-Final Office Action for U.S. Appl. No. 15/649,627 (dated Jan. 23, 2019).
Applicant-Initiated Interview Summary for U.S. Appl. No. 15/604,132 (dated Jan. 22, 2019).
Notification of Transmittal of the International Search Report and the Written Opinion of the International Searching Authority, or the Declaration for International Application Serial No. PCT/US2018/059282 (dated Feb. 11, 2018).
Notification of Transmittal of the International Search Report and the Written Opinion of the International Searching Authority, or the Declaration for International Application Serial No. PCT/US2018/041911 (dated Oct. 12, 2018).
Notice of Allowance and Fee(s) Due for U.S. Appl. No. 15/649,627 (dated May 30, 2019).
Final Office Action for U.S. Appl. No. 15/608,595 (dated Apr. 29, 2019).
Applicant-Initiated Interview Summary for U.S. Appl. No. 15/608,595 (dated Apr. 22, 2019).
Final Office Action for U.S. Appl. No. 15/604,132 (dated Apr. 16, 2019).
Notification of Transmittal of the International Search Report and the Written Opinion of the International Searching Authority, or the Declaration for International Application Serial No. PCT/US2018/059282 (dated Feb. 11, 2019)
Notice of Allowance and Fee(s) Due for U.S. Appl. No. 15/679,124 (dated Feb. 12, 2019).
"3rd Generation Partnership Project; Technical Specification Group Core Network and Terminals; Home Subscriber Server (HSS) diameter interfaces for interworking with packet data networks and applications (Release 14), " 3GPP TS 29.336 V.14.1.0, pp. 1-67 (May 2017).

* cited by examiner

METHODS, SYSTEMS AND COMPUTER READABLE MEDIA FOR PROVIDING SERVICE CAPABILITY EXPOSURE FUNCTION (SCEF) AS A DIAMETER ROUTING AGENT (DRA) FEATURE

PRIORITY CLAIM

This application claims the priority benefit of U.S. Provisional Patent Application Ser. No. 62/463,893 filed on Feb. 27, 2017 and U.S. Provisional Patent Application Ser. No. 62/464,064 filed on Feb. 27, 2017, the disclosures of which are incorporated herein by reference in their entireties.

TECHNICAL FIELD

The subject matter described herein relates to providing SCEF services. More particularly, the subject matter described herein relates to providing a SCEF as a DRA feature.

BACKGROUND

The service capability exposure function or SCEF is defined by third generation partnership project (3GPP) standards as a platform for allowing non-Internet protocol (non-IP) devices, such as Internet of Things (IoT) devices, to access 3GPP application services. The type of IoT devices for which the SCEF is designed include devices, such as sensors, which are powered by batteries, and that wake up, transmit data, then sleep to conserve battery power. Such devices typically do not implement an Internet protocol communications stack or self-locating capability, such as global positioning system (GPS) capability. As a result, there is a need for a function that allows such devices to connect to the network so that the devices can provide their data to the network, be located by the network, and communicate with other devices via the network. It is for these and other related purposes for which the SCEF is designed.

In light of the large numbers of IoT devices that are continually coming on line, SCEF services are needed. It is believed that the SCEF is currently being considered by mobile network operators as on-premises equipment, which requires independent capital expenditures, monitoring, and maintenance on the part of the mobile network operators. In light of these difficulties, there exists a need for alternative deployments of SCEF services.

SUMMARY

A system for providing a service capability exposure function (SCEF) as a Diameter routing agent (DRA) feature includes a DRA including a plurality of message processors. The system further includes a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling.

A method for providing a SCEF as a DRA feature includes providing a DRA including a plurality of message processors. The method further includes providing a CDC service module operatively associated with the DRA for providing SCEF services as a feature of the DRA, the SCEF services including determining whether to invoke IoT service handling based on content of received messages and for forwarding messages requiring IoT service to an SCS or an AS for receiving the IoT service handling.

Providing SCEF, SCS, and AS services as a DRA feature may, in one implementation, include providing these services as cloud-implemented services hosted by the DRA vendor. The interface for accessing such services may be implemented on the DRA and may access the cloud-implemented SCEF, SCS and AS services transparently to the DRA user (mobile network operator). In an alternate implementation, the SCEF, SCS, and AS services may be implemented using on-premises hardware and software resident on the DRA.

The subject matter described herein may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Examples of the subject matter described herein will now be explained with reference to the accompanying drawings, wherein like reference numerals represent like parts, of which.

DETAILED DESCRIPTION

The subject matter described herein includes methods, systems, and computer readable media for providing a SCEF and related services as a DRA feature. In one exemplary implementation, the SCEF and related services (e.g., SCS and AS services) are cloud-deployed services hosted by the DRA vendor and accessible via an interface provided by the DRA. In an alternate implementation, the SCEF and related services are provided using on-premises hardware and software of the DRA or a computing platform local to but separate from the DRA.

Figure 1:
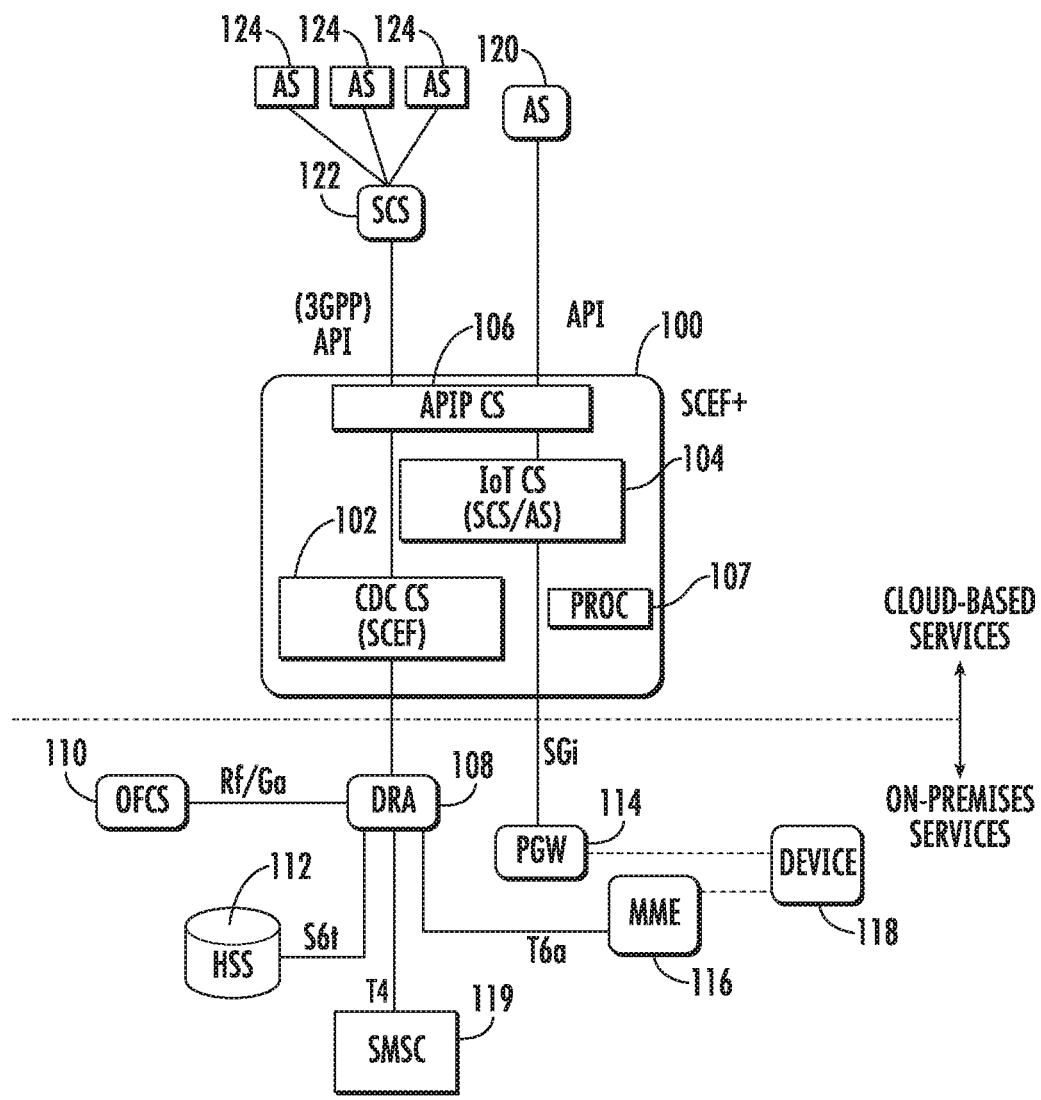
FIG. 1 is a network diagram illustrating a platform that integrates SCEF, SCS, and AS services, where the platform is deployed as a cloud service according to an aspect of the subject matter described herein.

FIG. 1 is a network diagram illustrating a platform for providing SCEF, SCS, and AS services according to an aspect of the subject matter described herein. Referring to FIG. 1, the network includes a platform 100 labeled SCEF+, because the platform provides SCEF functions and additional functions, such as SCS and AS functions. In the illustrated example, a cellular device connectivity (CDC) service module 102 provides the SCEF functions, and an IoT service module 104 provides SCS and AS functions. Platform 100 also includes an application programming interface platform (APIP) 106 service module that provides application programming interface (API) and associated policy services to IoT and other devices. Examples of such services include application programming interface (API) authorization services, rate control, volume control, etc. Platform 100 may include at least one processor 107 for implementing modules 102, 104, and 106. In one implementation, processor 107 may be one or more general purpose microprocessors. Processor 107 may also or alternatively include one or more specialized processors, such as field programmable gate arrays (FPGAs) or application specific integrated circuits (ASICs) that implement the functions described herein.

In FIG. 1, platform 100 is implemented as a cloud service separate from on-premises equipment, which in the illustrated example includes a Diameter routing agent (DRA) 108, an offline charging system (OFCS) 110, a home subscriber server (HSS) 112, a packet data network (PDN) gateway (PGW) 114, and a mobility management entity (MME) 116. A device 118, which may be an IoT device, may connect to platform 100 via PGW 114 and/or MME 116. A short message service center (SMSC) 119 may also connect to platform 100 via DRA 108 that allows SMS-connected devices to access cloud services.

Also illustrated in FIG. 1 are services and network nodes that are accessible through platform 100. In FIG. 1, these services include an application server 120 and a service capability server 122 that provides access to a plurality of application servers 124. Thus, platform 100 provides both direct access to application services and indirect access through a service capability server.

In FIG. 1, CDC service module 102 performs SCEF functionality as specified by 3GPP Technical Specification (TS) 23.682, Version 14.2, Release 14.2.0 (2016-12), the disclosure of which is incorporated herein by reference in its entirety. Providing SCEF functionality includes providing access to 3GPP services for non-IP devices, such as IoT devices that do not implement an IP stack due to complexity and power conservation requirements. A typical IoT device that might require SCEF services is a sensor that transmits data to a network periodically and then sleeps between transmissions to conserve energy. In the case of mobile devices, SCEF functionality provided by CDC service module 102 may include determining the location and connectivity of the mobile devices (including location and connectivity of non-IP devices) using network resources, such as HSS 112 and MME 116, to avoid the need for the mobile devices to have built in location determining capabilities, such as GPS capabilities. CDC service module 102 may also, for non-IP traffic from device 118, determine whether to invoke IoT service handling provided by IoT service module 104 based on the access point name or other attributes of a received message.

As stated above, IoT service module 104 provides SCS services for IoT devices. Examples of such services include data brokering, implementing different transport protocols, including message queue telemetry transport-sensor network (MQTT-SN) and constrained application protocol (CoAP), data storage, such as cloud storage or software defined storage, and IoT application level analytics. The functionality of IoT service module 104 will be described in detail below.

Figure 2:
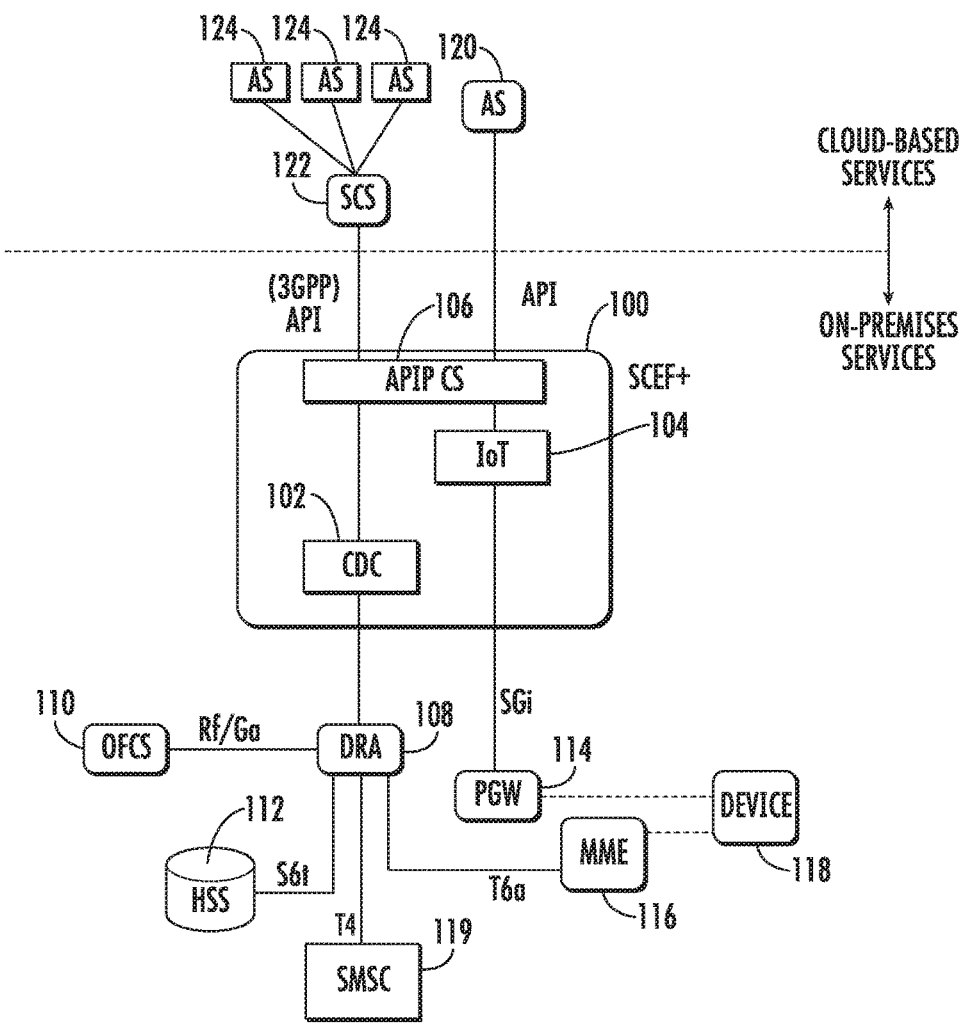
FIG. 2 is a network diagram illustrating a platform that integrates SCEF, SCS, and AS services, where the platform is deployed as an on-premises or ground-based service according to an aspect of the subject matter described herein.

In FIG. 1, each of service modules 102, 104, and 106 are further labeled with "CS", indicating that the services they provide are cloud services. In an alternate implementation, platform 100 may be implemented as on-premises or ground-based equipment. Such an implementation is illustrated in FIG. 2. In FIG. 2, platform 100 is implemented by on-premises equipment hosted by the same entity (e.g., a telecommunications network operator) that hosts any one or more of DRA 108, OFCS 110, HSS 112, PGW 114, and/or MME 116. In addition, any of the functionality within platform 100 may be cloud-based or ground-based without departing from the scope of the subject matter described herein. In FIG. 2, AS 120, SCS 122, and as 124 are shown as cloud services. Any one or more of these services can be provided using on-premises equipment without departing from the scope of the subject matter described herein.

Figure 3:
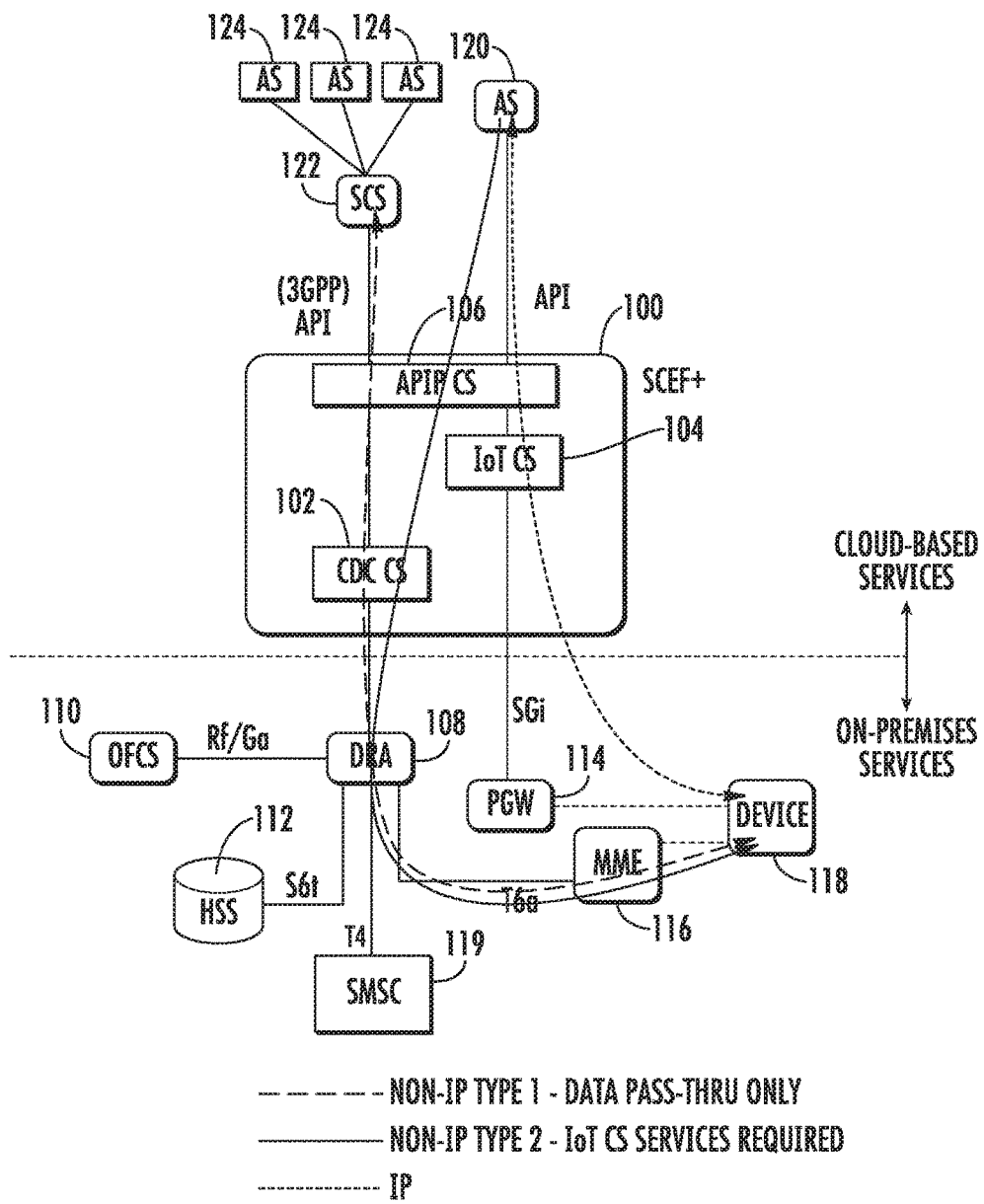
FIG. 3 is a message flow diagram illustrating message processing by a platform that integrates SCEF, SCS, and AS services, according to an aspect of the subject matter described herein.

FIG. 3 is a message flow diagram illustrating exemplary processing of messages by CDC service module 102. In FIG. 3, the dashed line represents a non-IP message from device 118 that CDC service module 102 identifies as requiring data pass-through service. As indicated above, such a determination may be made by CDC service module 102 based on the access point name or other message parameters. In response to identifying the message as requiring data pass through service, CDC service module 102 forwards the message to SCS 122. SCS 122 forwards the message to one of application servers 124 to receive application level service.

The solid line in FIG. 3 represents non-IP traffic from device 118 that CDC service module 102 identifies as requiring IoT platform services. Accordingly, CDC service module 102 forwards the message to IoT service module 104. IoT service module 104 forwards the message to application server 120. Application server 120 provides the application service needed by the message. The dotted line in FIG. 3 represents IP messaging from device 118 that is processed by IoT service module 104, which forwards the messages to application server 120.

Cellular Device Connectivity Service Module

The following are exemplary functions that may be performed by CDC service module 102. For example, CDC service module 102 may perform the functions of a 3GPP SCEF and a 3GPP machine type communications interworking function (MTC-IWF). 3GPP SCEF and MTC-IWF functions are defined in 3GPP TS 23.682 referenced above. MTC-IWF functions include providing a Tsp reference point for service capability servers. Service capability servers select and connect to an MTC-IWF. The service capability server may then set triggers with the MTC-IWF to be notified when an event involving an MTC device occurs. For example, an SCS may set a trigger with an MTC-IWF to be notified when data from a particular device, such as a sensor, is received by MTC-IWF. Thus, by providing MTC-IWF functions, CDC service module 102 allows devices that follow the MTC-IWF communications model to receive SCS and AS services.

CDC service module 102 also facilitates the providing of SCS services by forwarding messages requiring SCS services to IoT service module 104. As illustrated in FIG. 3, for non-IP traffic from a device, CDC service module 102 decides whether to invoke IoT CS handling based on one or more attributes in a received message. One example of an attribute that may be used is an attribute that identifies the application, such as the access point name (APN). CDC service module 102 may also support or provide a secure interface to a $3^{rd}$ party SCS and/or AS. CDC service module may also provide 3GPP event monitoring for IP, non-IP, and SMS-connected devices. Examples of events that may be monitored include changes in device location, device activation, device deactivation, etc. The events may be derived from network nodes, such as MMEs and HSSs, instead of from the devices themselves, which may not have the capability to provide such information due to power and/or bandwidth limitations. Other services that may be provided by CDC service module 102 alone or in combination with IoT service module 104 include IoT monetization, data storage, big data, analytics, and mobile platform integration (e.g. iOS, Android).

Figure 4:
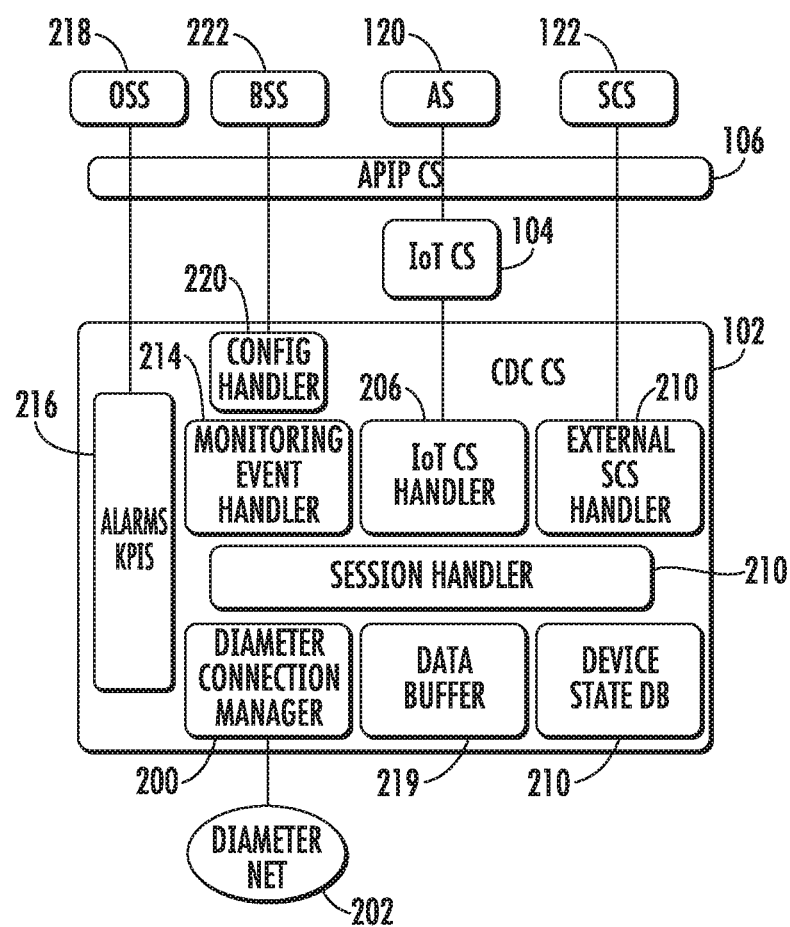
FIG. 4 is a block diagram illustrating exemplary components of a cellular data connectivity service module according to an aspect of the subject matter described herein.

FIG. 4 is a block diagram illustrating CDC service module 102 in more detail. In FIG. 4, CDC service module 102 includes a Diameter connection manager 200 that manages Diameter connections with nodes in a Diameter network 202. CDC service module 102 further includes a session handler 204 that is the central point of communication between Diameter nodes in a cellular communications network and service capability server/application server (SCS/AS) handlers, such as IoT CS handler 206 and external SCS handler 208. CDC service module 102 utilizes a device state database 210 to store device/session state. CDC service module 102 utilizes a data buffer 212 to buffer messages to and from devices as needed. Device state database 210 stores dynamic states of active devices, such as IoT devices, that are connected to CDC service module 102. A monitoring event handler 214 provides APIs to configure and report monitoring events at the MME or user level. An alarms and key performance indicator (KPI) module 216 provides alarms and KPI data regarding the functionality of CDC service module 102 and provides the alarms and measurement data to external systems, such as operations support system (OSS) 218.

IoT CS handler 206 includes an IoT cloud service (CS) gateway client library. External SCS handler 208 provides an interface to an SCS and/or an AS. A configuration handler 220 provides APIs for any configuration required by CDC. Configuration handler 220 may provide a graphical user interface to facilitate configuration of CDC service module 102. Configuration handler 220 may also interface with a business support system (BSS) to allow customers to provision business rules in CDC service module 102.

IoT Service Module

IoT service module 104 may implement the functions of 3GPP SCS. Briefly, these functions include providing an interface for IP and non-IP devices to 3GPP application servers. IoT service module 104 may receive both IP and non-IP data (from CDC service module 102) originated by mobile devices. IoT service module 104 may support a secure interface to a $3^{rd}$ party SCS/AS. Other services that may be provided by IoT service module 104 alone or in combination with CDC service module 102 include IoT monetization, storage, big data, analytics, and mobile platform integration (e.g. iOS, Android).

Figure 5:
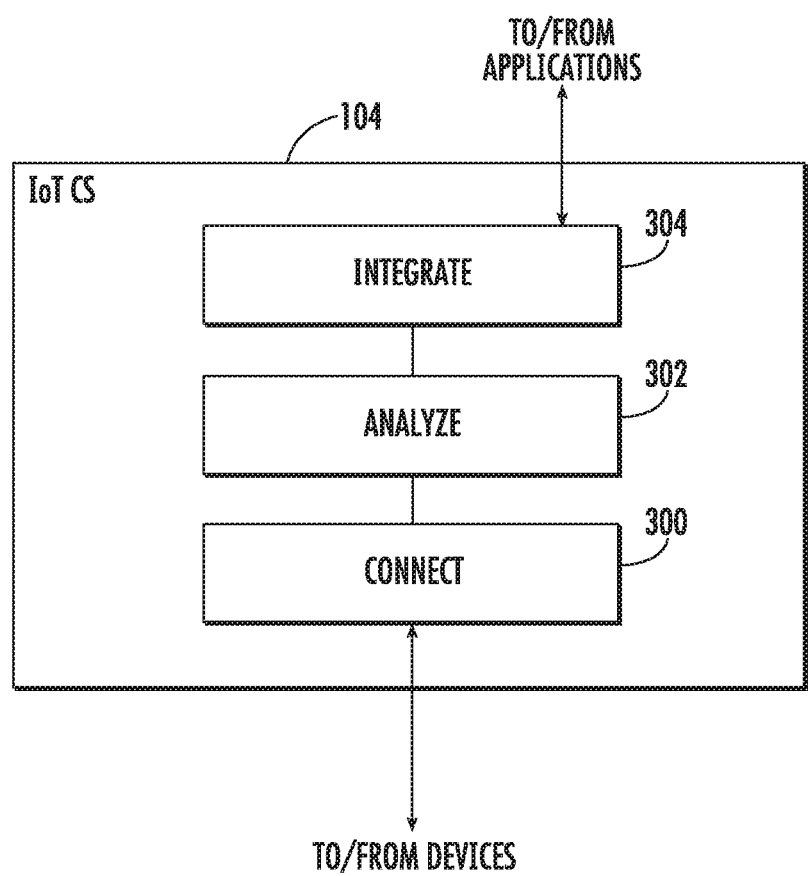
FIG. 5 is a block diagram illustrating exemplary components of an IoT service module according to an aspect of the subject matter described herein.

FIG. 5 is a block diagram of IoT service module 104 illustrating exemplary functionality of IoT service module 104 according to the subject matter described herein. Referring to FIG. 5, IoT service module 104 includes a connect module 300, an analyze module 302, and an integrate module 304. Connect module 300 may be configured to virtualize any device (such as an IoT device) and connect and communicate with that device. Analyze module 302 may be configured to process and store data from devices, such as by providing analytics. Integrate module 304 may be configured to provide such data, status and analytics to other systems, such as systems external to IoT service module 104.

Cloud-Based SCEF Deployment

Figure 6:
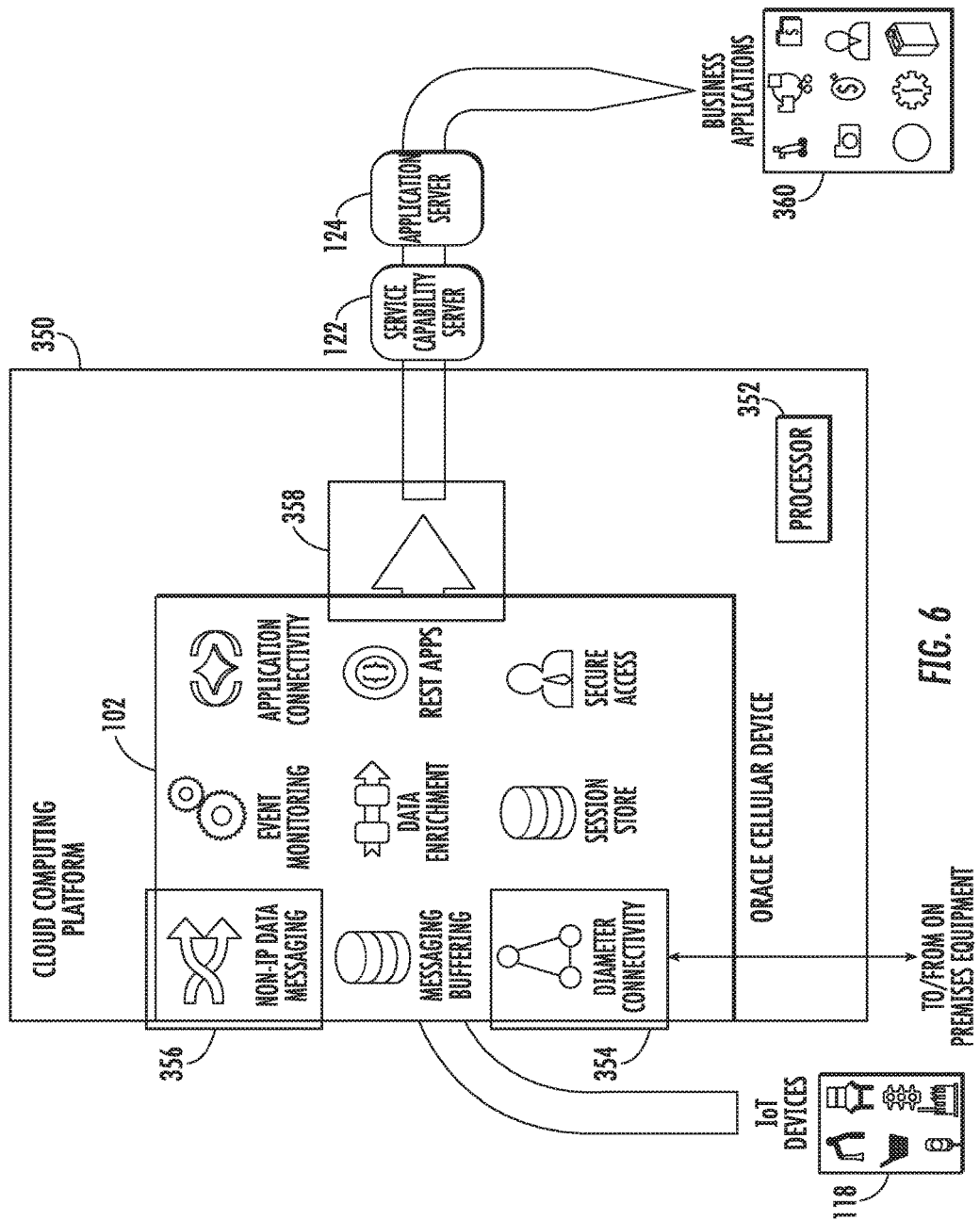
FIG. 6 is network diagram illustrating a cloud based deployment of a platform including a cellular data connectivity service module according to an aspect of the subject matter described herein.

As indicated above, platform 100 and/or any of its components may be deployed in a cloud network such that the services provided by platform 100 or any one or more of its components are cloud based and separate from on-premises equipment of mobile communications network operators. In addition, although in the examples illustrated in FIG. 1-5, CDC service module 102, which provides SCEF and related functionality, is deployed along with IoT service module 104 and APIP service module 106, the subject matter described herein is not limited to such an implementation. In an alternate implementation, CDC service module 102 may deployed separately from the service modules that implement AS, SCS, and/or API services. FIG. 6 illustrates such an implementation. Referring to FIG. 6, CDC service module 102 is deployed on a cloud computing platform 350 that is separate from on premises equipment, such as DRAs, MMEs, HSSs, and hosted by a different entity than the entity (e.g., a mobile network operator) that hosts the DRAs, MMEs, and HSSs. In FIG. 6, cloud computing platform 350 includes a processor 352 on which CDC service module 102 may be implemented. CDC service module 102 includes an on-premises equipment cloud access interface 354 through which on-premises equipment can communicate with CDC service module 102. CDC service module 102 further includes an IoT device cloud access interface 356 for allowing IoT devices 118 to access CDC service module 102. CDC service module 102 further includes a service capability server/application server (SCS/AS) interface 358 that allow communications between CDC service module 102, SCS 122, and AS 124. In the illustrated example, AS 124 may host one or more business applications 360.

Diameter Connectivity

In one exemplary implementation, on-premises equipment cloud network access interface 354 may be a Diameter interface that interfaces with a Diameter connection manager implemented in a DRA that provides RFC 6733 compliant Diameter endpoint(s) that terminate Diameter connections from the network. The Diameter connection manager may implement secure, performant Diameter connectivity from customer on-premises network to a cloud via dedicated virtual private network (VPN), transmission control protocol/transport layer security (TCP/TLS), or stream control transmission protocol/datagram transport layer security (SCTP/DTLS). Diameter connectivity to platform 100 or platform 350, may originate from one or more pair of DRAs within the network. This allows simplified interconnect and leveraging of DRA capabilities such as signaling congestion control and IoT HSS address resolution which play an important role in the 3GPP machine type communication architecture.

In order to leverage standard Diameter connectivity and routing functionality that exists in the current network, platform 100 or 350 expose a minimum of 2 (two) unique Diameter identities located in separate cloud data centers. The DRAs may route Diameter traffic toward platform 100 or 350 using a primary/secondary or load share scheme. The Diameter connection manager may load share received Diameter traffic to the geo-redundant CDC session handling service components for further processing. Egress Diameter message routing for messages transmitted from platform 100 or 350 may be based on Destination-Host and/or Destination-Realm attribute value pairs (AVPs).

Device Sessions

In one exemplary implementation, CDC service module 102 maintains state of device sessions for IoT devices that access AS or SCS services using CDC service module 102. CDC service module 102 utilizes device state database 210 (see FIG. 4) to update the dynamic state of the device and device's T6a connection (session). CDC service module 102 utilizes data buffer 219 to buffer messages to/from devices as needed (when a device or SCS/AS is temporarily unreachable).

Device state database 210 may store the dynamic state of active devices. The following table gives an example of the contents of the device state database 210.

| Field | Notes |
| --- | --- |
| International Mobile Station Identity (IMSI) | |
| International Mobile Equipment Identifier (IMEI) | |
| External ID | |
| Device ID | For use with IoT service module 104 |
| APN | Used to identify SCS/AS |
| EPS Bearer ID | |
| Serving Node ID | MME or serving general packet radio service support node (SGSN) ID |

Monitoring Events

CDC service module 102 provides APIs which can be used to configure and report monitoring events at the device or MME level. These APIs can be invoked or reported to IoT service module 104 or external SCS/AS systems. For example, the following monitoring events may be monitored by CDC service module 102:

User Equipment (UE) Reachability
    Reachable for Data
    Reachable for short message service (SMS)
Location
    Current Location
    Last Known Location
UE Loss of Connectivity
Communication Failure
Roaming Status
IMEI Change
Number Of UEs Per Location
Availability After Downlink Data Notification (DDN) Failure IoT Service Module (Internal SCS/AS) Interface As stated above, IoT service module 104 provides SCS and AS services, which, in some instances, are provided on the same platform as CDC service module 102. CDC service module 102 functions as a device gateway to support non-IP data transfer over the T6a interface towards the devices. CDC service module 102 utilizes the IoT CS gateway client library (see FIG. 4) to communicate with the IoT CS via its standard APIs.

External SCS/AS Interface

As illustrated in FIG. 6, CDC service module 102 provides APIs towards external SCS/AS systems. These APIs include:

Access to the device registration and metadata database,
Access to the internal time series data store for retrieving IoT data,
A high level device virtualization API to trigger device actions or retrieve device data, and
Low level messaging APIs to communicate with devices via IoT service module 104.

Call Detail Record (CDR) Generation

CDC service module 102 can generate CDRs and make them available to offline charging systems via the Rf interface. In the event of an OFCS failure, CDRs can be stored internally by CDC service module 102 for a configurable amount of time (e.g. 24 hours) depending upon message traffic. In the future or as an alternative, integration with a cloud based charging service could be used.

Deployment

Real-time cloud services provided by CDC service module 102, IoT service module 104, and APIP service module 106 may be hosted in a cloud network separate from a mobile network operator's on-premises network. One example of such a cloud network is the Oracle Bare Metal Cloud (BMC).

Figure 7:
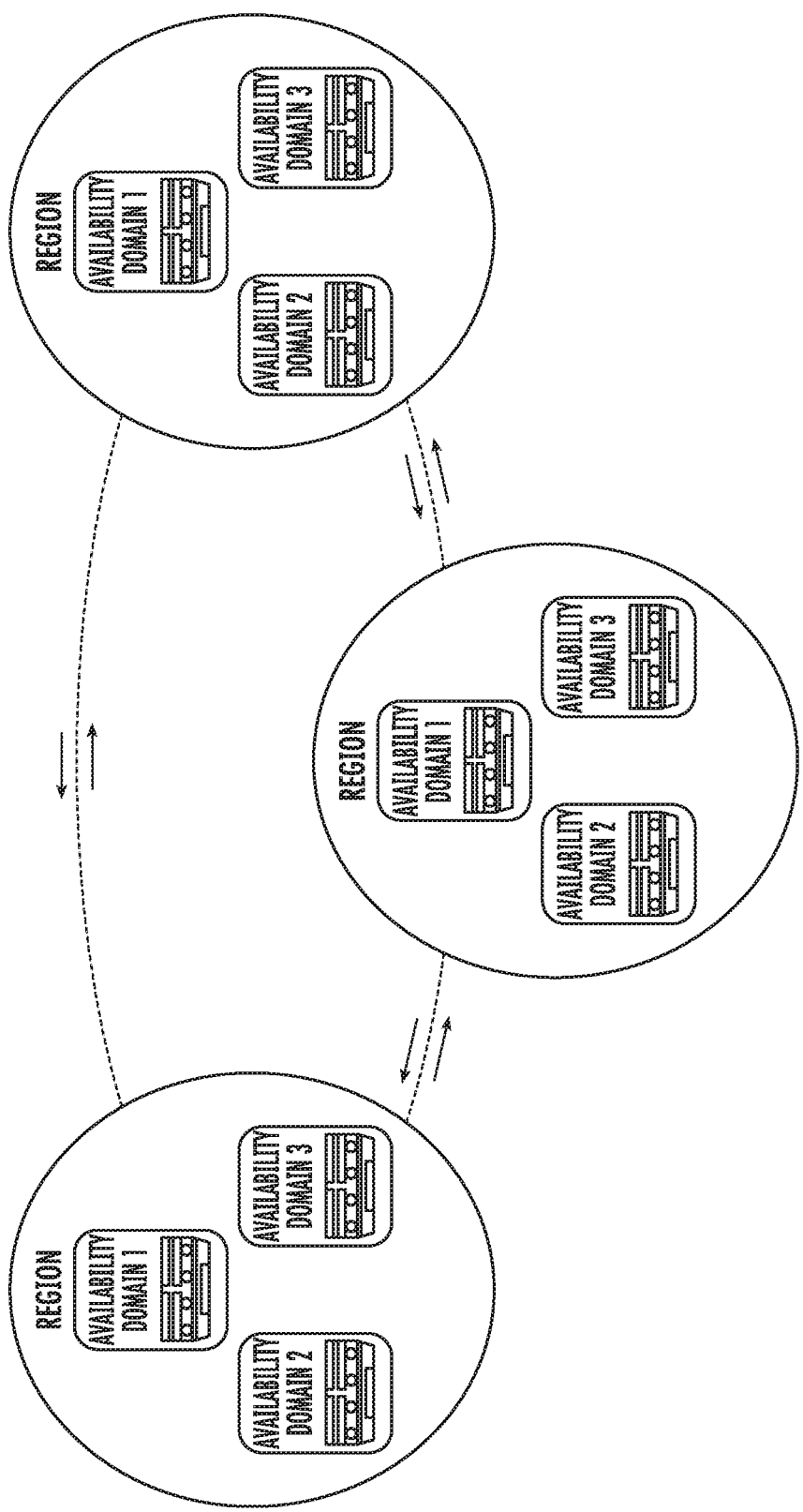
FIG. 7 is a network diagram illustrating exemplary regions and availability domains (data centers) in a cloud network in which the cellular data connectivity service module and/or the platform that integrates SCEF, SCS, and AS services may be deployed.

In one exemplary implementation, the Oracle Bare Metal Cloud consists of a set of interconnected data centers (see FIG. 7).

Availability

Figure 8:
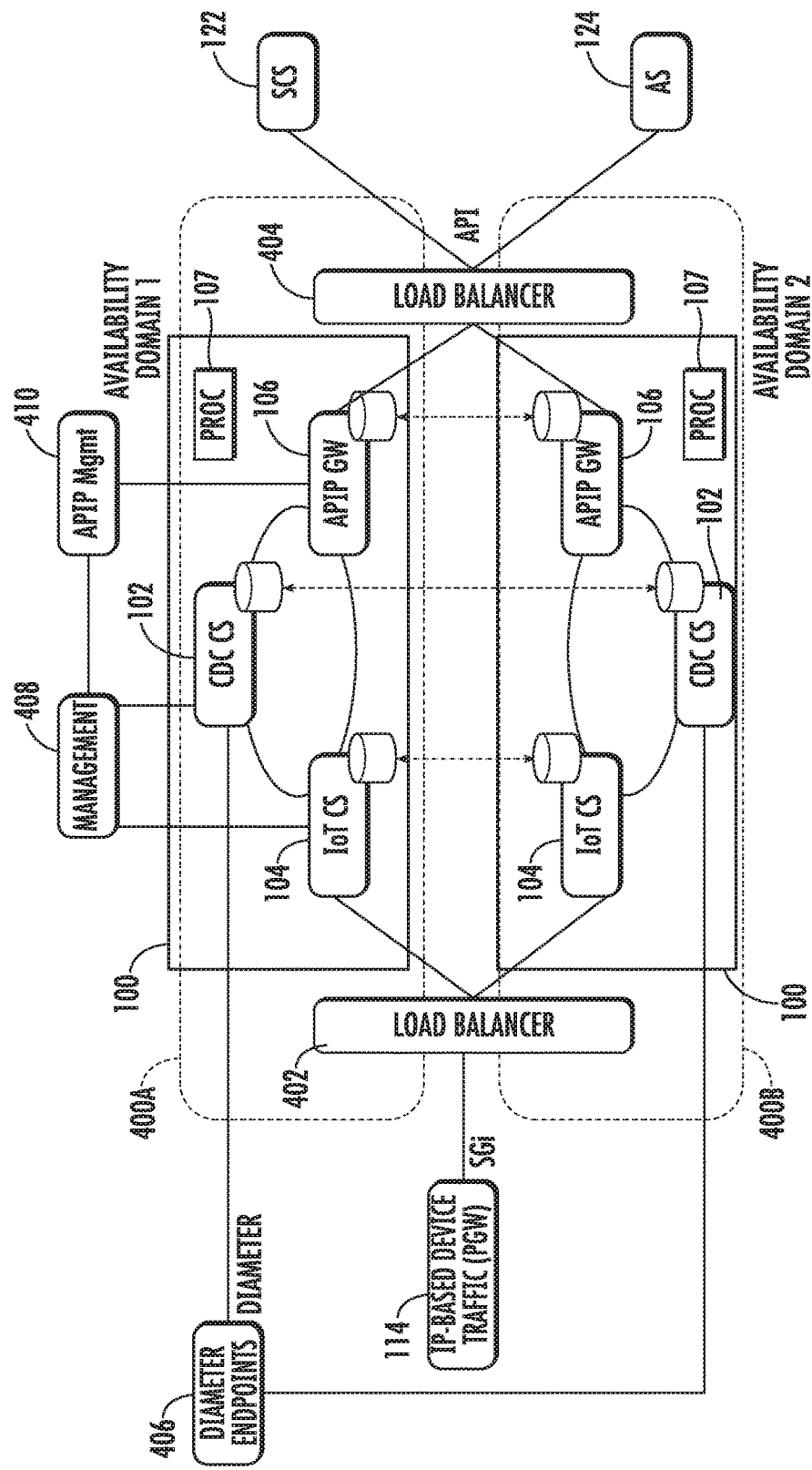
FIG. 8 is a network diagram illustrating exemplary cloud-based deployment of the platform that integrates SCEF, SCS, and AS services according to an embodiment of the subject matter described herein.

As shown in FIG. 8, in one example, platform 100 or 350 may be deployed in different availability domains (data centers) within the same region. In FIG. 8, each platform 100 is redundantly deployed in different availability domains 400A and 400B. It is understood that platform 350 can likewise be redundantly deployed in different availability domains. In FIG. 8, each instance of platform 100 may be active at all times. In the event of failure of one availability domain, all traffic will be directed to the other availability domain. Provisioned and dynamic (e.g. session) data may be shared between the active instances of platform 100 across availability domains. Sharing provisioned data and dynamic session data between the instances of platform 100 prior to failure of one of platforms 100 or its corresponding availability domain enables an instance of platform 100 to seamlessly take over handling of the sessions of the failed platform.

In FIG. 8, load balancers 402 and 404 load share message traffic between platforms 100 located in the different availability domains. Because platforms 100 share state information across availability domains, it is not necessary to consider session state when making load balancing decisions. As a result, the traffic and processing load on platforms 100 can be equalized or balanced. This load balancing applies to traffic from IoT devices transmitted from packet gateway 114 and traffic from SCS 122 and AS 124. Diameter endpoints 406 may have connections to platforms 100 in both availability domains 400A and 400B. Because CDC service modules 102 share session state information across availability domains, Diameter traffic can be sent to either availability domain and be correctly processed by the receiving CDC service module 102 according to the session state stored for each session.

Diameter

Diameter connections from network elements may be established directly to each instance of CDC service module 102. Each CDC service module instance may have its own IP address, local host ID, etc. and appear as a separate SCEF network element.

SGi

The SGi interface provides IP connectivity from an IoT device to IoT service module 104. A single IP address may be shared across availability domains 400A and 400B, and messages to/from IoT devices can be directed to either instance of IoT service module 104.

APIs

Similar to SGi traffic, a single API exposure may be provided to the tenant's systems and traffic will be directed to any API gateway across the availability domains 400A and 400B.

Management Interfaces

Although not explicitly shown in FIG. 8, it is envisioned that all management interfaces, such as management interface 408, may be API based and accessible via an API gateway. Note that this doesn't apply to the interface between the API management service 410 and APIP service modules 106, which may be an internal or non-public interface accessible only to the operator of the cloud network.

Scalability

In one exemplary implementation, each platform 100 or 350 may be deployed with more capacity than subscribed. Traffic handled by each platform 100 or 350 may be continually monitored to ensure there is more capacity than needed. The services provided by platform 100 or 350 are designed to operate as a black box to consumers of the service. To achieve this, they are composed of a set of components that can be horizontally scaled, and each principal function can be independently scaled. For example, CDC service modules 102 can be scaled independently of IoT service modules 104 based on demand.

Thus, the subject matter described herein includes a cloud based deployment of SCEF and related services. By deploying SCEF and related services in a cloud, network operators can subscribe to the services and not be required to purchase and maintain on-premises equipment. In addition, a cloud based deployment of SCEF and related services may be more reliable than an on-premises deployment when deployment occurs across availability domains and state is shared between the availability domains.

SCEF as a DRA Feature

Figure 9:
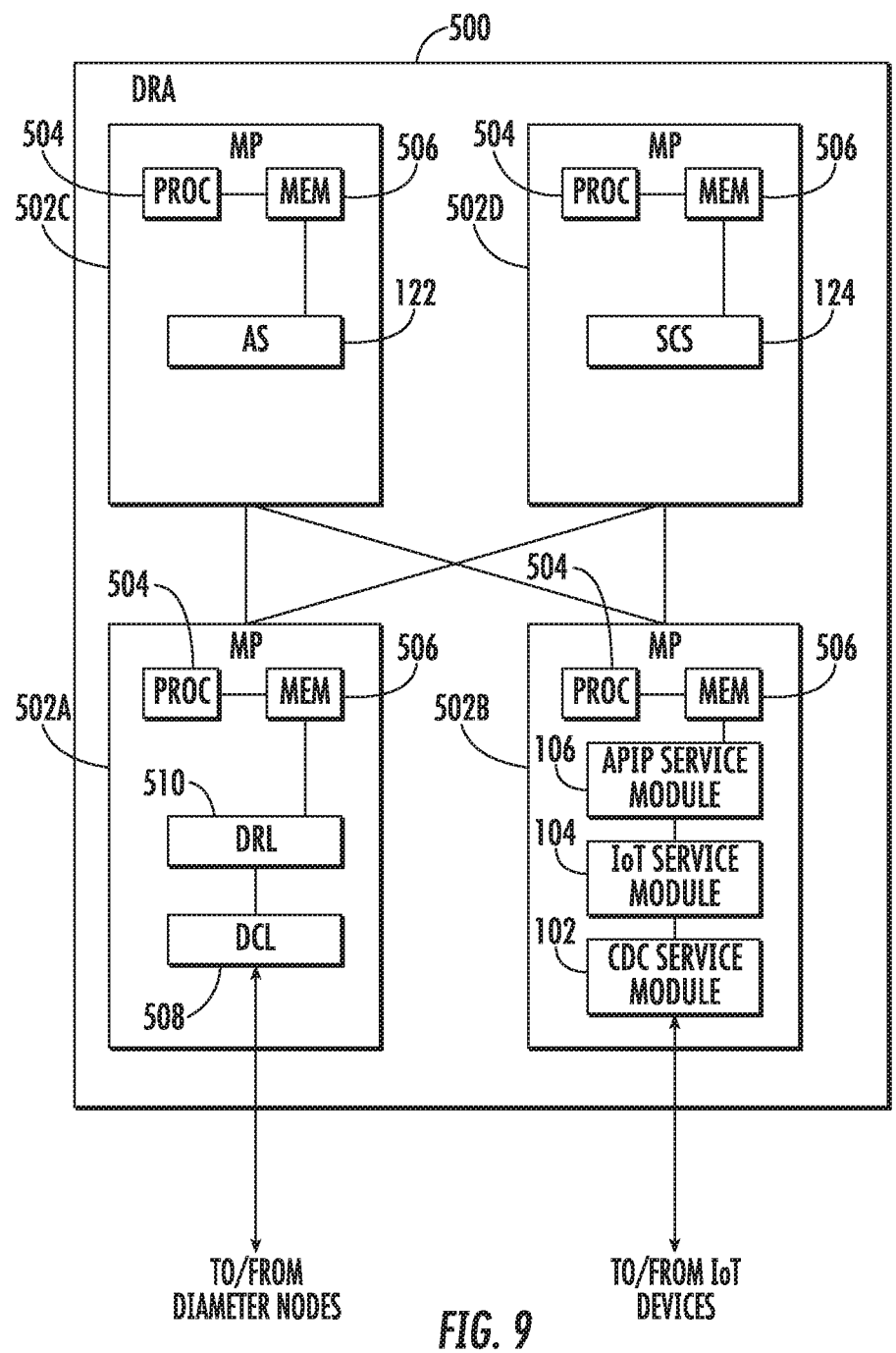
FIG. 9 is a block diagram illustrating a DRA with integrated SCEF, SCS, and AS services according to an aspect of the subject matter described herein.

According to yet another aspect of the subject matter described herein, the SCEF may be provided as a DRA feature. FIG. 9 is a block diagram of a DRA with an integrated CDC service module 102 that provides SCEF services. In FIG. 9, a DRA 500 includes a plurality of message processors 502A-502D each comprising a printed circuit board with at least one processor 504 and a memory 506. In the illustrated example, message processor 502A includes a Diameter connection layer (DCL) 508 that establishes and maintains Diameter connections with external Diameter nodes. Message processor 502A further includes a Diameter routing layer (DRL) 510 that routes Diameter signaling messages based on Diameter level information in the messages.

Message processor 502B includes CDC service module 102 that provides SCEF services, including receiving messages from IoT devices, determining whether the messages require SCS or AS services, and forwarding the messages requiring SCS or AS services to an SCS or AS for receiving such services. Message processor 502B also includes IoT service module 104 that provides SCS and AS services for at least some of the received signaling messages identified as requiring such services. Message processor 502B also includes APIP service module 106 that provides APIs for interfacing with SCSs and ASs, both internal and external to DRA 500 Thus, in some cases, if SCS or AS services can be provided locally by IoT service module 104, the messages are received by CDC service module 102, forwarded to IoT service module 104 where they receive SCS or AS processing.

Message processor 502C includes application server 122, and message processor 502D includes service capability server 124. Accordingly, for some received messages identified as requiring SCS or AS handling, IoT service module 104 may forward the messages to SCS 122 or AS 120 where the messages are processed. APIs provided by APIP service module 106 may be used to access SCS 122 or AS 120. Messages originated by SCS 122 or AS 120 can be sent to IoT devices via CDC service module 102.

Figure 10:
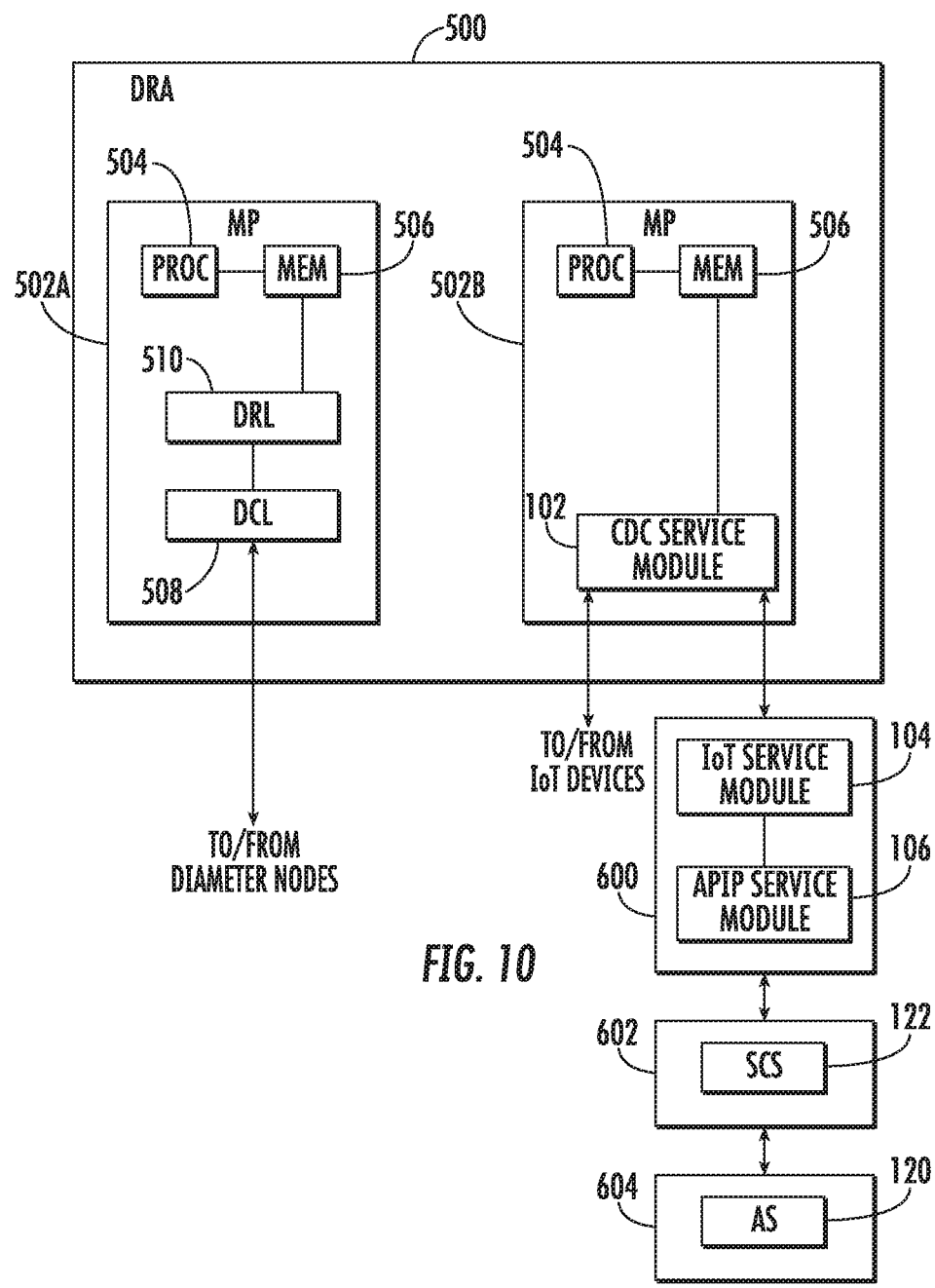
FIG. 10 is a block diagram illustrating a DRA with integrated SCEF services according to an aspect of the subject matter described herein.

Although in FIG. 9, each of CDC service module 102, IoT service module 104, APIP service module 106, SCS 122 and AS 124 are shown as components of DRA 500, the subject matter described herein is not limited to such an implementation. In an alternate implementation, any one or more of these components may be provided on a computing platform separate from DRA 500. FIG. 10 illustrates such an embodiment. In FIG. 10, CDC service module 102 is implemented on DRA 500, IoT service module 104 and APIP service module 106 are implemented on a first computing platform 600 separate from DRA 500, SCS 122 is implemented on a second computing platform 602 separate from DRA 500, and AS 120 is implemented on a third computing platform 604 separate from DRA 500. Each computing platform 600, 602, and 604 may include at least one processor (not shown in FIG. 10). It should also be noted that any one or more of DRA 500 and computing platforms 600, 602, and 604 may be deployed as on-premises equipment of a mobile network operator or as cloud network equipment operated by an entity separate from the mobile network operator.

Thus, the by providing the SCEF, AS, and/or SCS functions as DRA features, the subject matter described herein reduces messaging in the network over implementations where the DRA, SCEF, AS, and SCS are implemented on separate computing platforms. Message latency between DRA, SCEF, SCS, and AS functions is reduced when the functions are implemented on the same computing platform. The likelihood of incompatibility between the DRA, SCEF, and AS functions is reduced when these functions are implemented on the same computing platform.

Figure 11:
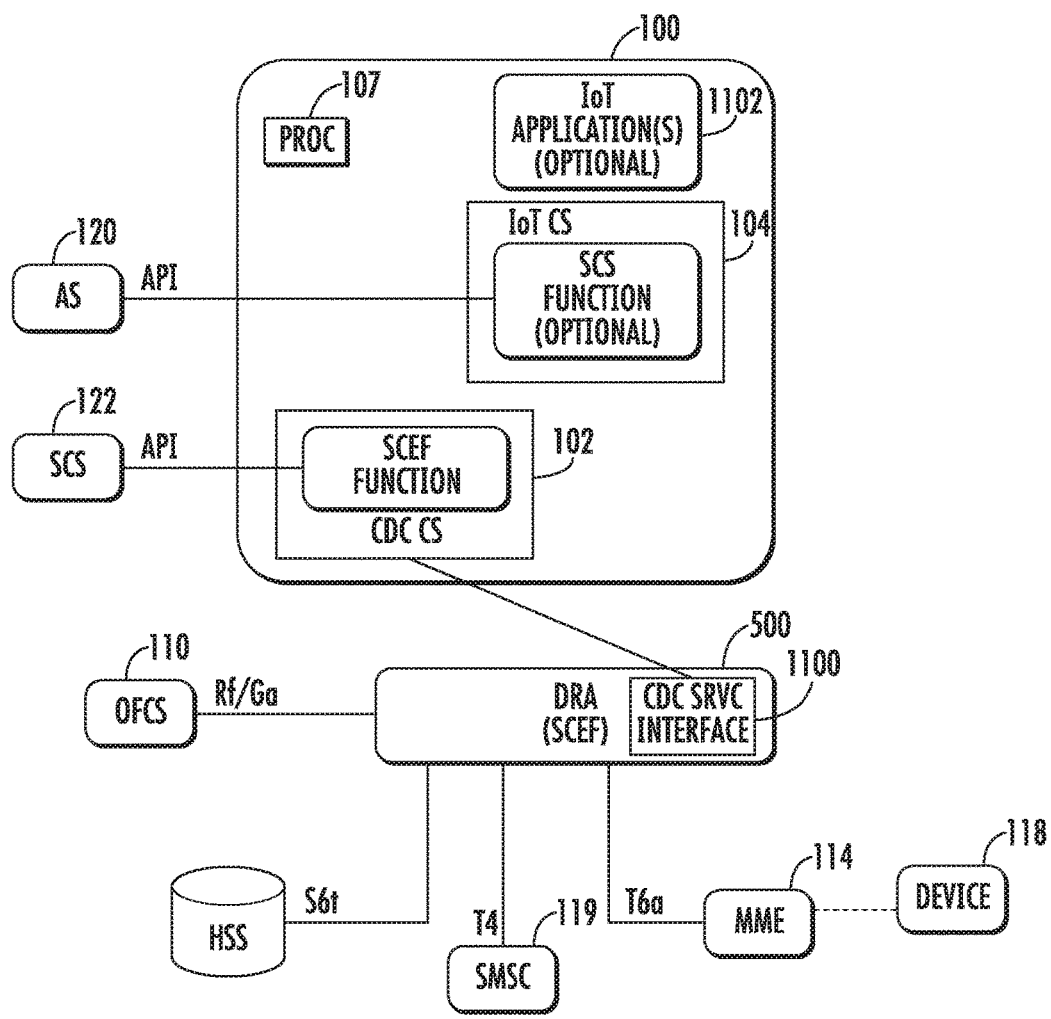
FIG. 11 is a block diagram illustrating a DRA providing access to cloud-deployed SCEF services hosted by the DRA vendor according to an aspect of the subject matter described herein.

FIG. 11 illustrates yet another exemplary deployment of SCEF services as a DRA feature. In FIG. 11, DRA 500 includes a CDC service interface 1100 to a cloud-deployed CDC service module 102 that provides cloud-based SCEF services, as described above. CDC service interface 1100 may be implemented on any of the message processors of DRA 500 as illustrated in FIG. 9 or 10. In one exemplary implementation, CDC service interface 1100 may implement a Diameter interface to CDC service module 102. In an alternate implementation, SCEF interface may implement web service APIs to CDC service module 102. The fact that SCEF services are cloud-based instead of implemented as on-platform functions of DRA 500 may be transparent to the DRA user (e.g., a mobile network operator). As a result, a DRA user may purchase a DRA with some features implemented in DRA-resident hardware and software, but some features, such as SCEF services, that are not delivered as software like normal, but are instead hosted by a third party service provider, such as a network equipment vendor.

In addition to providing an interface to cloud-deployed SCEF services, CDC service interface 1100 may also provide an interface for cloud-deployed SCS and AS services. In FIG. 11, SCS services are provided by CDC service module 102 and AS services are provided by AS 120. CDC service interface 1100 on DRA 500 may access SCS and AS services through CDC service module 102 or directly by providing a Diameter or web services interface to CDC service module and/or AS 120. In FIG. 11, platform 100 also includes IoT applications 1104 that provide IoT services for IoT devices, such as device 118.

Figure 12:
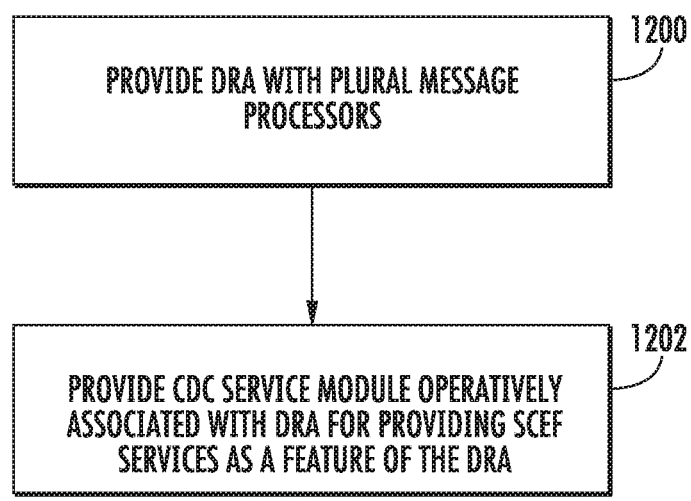
FIG. 12 is flow chart illustrating an exemplary process for providing access to cloud-deployed SCEF services hosted by a DRA vendor according to an aspect of the subject matter described herein.

FIG. 12 is a flow chart illustrating an exemplary process for providing a SCEF function as a DRA feature. Referring to FIG. 12, in step 1200, the process includes providing a DRA including a plurality of message processors. For example, providing a DRA may include providing DRA 500 in any of FIGS. 9-11 where the SCEF, SCS, and AS are implemented as DRA-resident software or as services hosted by the DRA vendor.

In step 1202, the process includes providing a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling. For example, as illustrated in FIGS. 9-11, SCEF, SCS, and/or AS services can be implemented as DRA-resident software or as cloud-based services hosted by the DRA vendor.

Providing SCEF, SCS, and/or AS services as cloud-deployed services as a DRA feature hosted by the DRA vendor allows the DRA vendor to seamlessly provide and upgrade such services without requiring the DRA operator (e.g., mobile network operator) to continually purchase new hardware and software for each incremental change. The DRA vendor can meter access to hosted SCEF, SCS, and AS services using a metering function, which may be implemented on DRA 500 or in the service cloud. In one exemplary implementation, such metering may be performed by CDC service interface 1100 illustrated in FIG. 11.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing a service capability exposure function (SCEF) as a Diameter routing agent (DRA) feature, the system comprising:
   a DRA including a plurality of message processors, wherein the message processors include a first message processor including a printed circuit board, a processor, and a memory for implementing a Diameter connection layer (DCL) for establishing and maintaining Diameter connections with external Diameter nodes and a Diameter routing layer (DRL) for routing Diameter signaling messages based on Diameter layer information in the Diameter signaling messages; and
   a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling, wherein the DRA includes a second message processor comprising a printed circuit board, a processor and a memory for implementing a CDC service interface to the CDC service module or for implementing the CDC service module, wherein the CDC service module is configured to function as a machine type communications interworking function (MTC-IWF).

2. The system of claim 1 wherein the CDC service module is implemented as a cloud-deployed service separate from the DRA and wherein the second message processor of the DRA implements the CDC service interface for accessing the CDC service module transparently to a user of the DRA.

3. The system of claim 2 wherein the SCS and the AS are cloud-based services and the CDC service interface accesses the SCS and AS transparently to the user of the DRA.

4. The system of claim 2 wherein the CDC service interface provides a Diameter interface to the CDC services module.

5. The system of claim 2 wherein the CDC service interface provides a web services interface to the CDC service module.

6. The system of claim 1 wherein the CDC service module is implemented on the second message processor of the DRA.

7. The system of claim 1 wherein the CDC service module is configured to perform event monitoring for Internet protocol (IP) and non-IP traffic using Diameter signaling with Diameter network nodes.

8. The system of claim 7 wherein the event monitoring includes monitoring location and reachability for IP, non-IP, and SMS-connected devices.

9. The system of claim 1 comprising an IoT service module implemented by one of the message processors for providing SCS and AS services for at least some of the received messages.

10. The system of claim 1 comprising a computing platform separate from the DRA and wherein an IoT service module is implemented on the computing platform for providing SCS and AS services for at least some of the received messages.

11. A method for providing a service capability exposure function (SCEF) as a Diameter routing agent (DRA) feature, the method comprising:
provide a DRA including a plurality of message processors, wherein the message processors include a first message processor comprising a printed circuit board, a processor, and a memory for implementing a Diameter connection layer (DCL) for establishing and maintaining Diameter connections with external Diameter nodes and a Diameter routing layer (DRL) for routing Diameter signaling messages based on Diameter layer information in the Diameter signaling messages; and
providing a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling, wherein the DRA includes a second message processor comprising a printed circuit board, a processor, and a memory for implementing a CDC service interface to the CDC service module or for implementing the CDC service module, wherein the CDC service module is configured to function as a machine type communications interworking function (MTC-IWF).

12. The method of claim 11 wherein providing the CDC service module includes providing the CDC service module as a cloud-deployed service separate from the DRA and wherein providing the DRA comprises providing the CDC service interface as a feature of the DRA implemented on the second message processor for accessing the CDC service module transparently to a user of the DRA.

13. The method of claim 12 wherein the SCS and the AS are cloud-based services and wherein the method further comprises providing, by the CDC service interface, access to the SCS and AS transparently to the user of the DRA.

14. The method of claim 12 wherein providing the interface to the CDC service module includes providing a Diameter interface to the CDC service module.

15. The method of claim 12 wherein providing the interface to the CDC service module comprises providing a web services interface to the CDC service module.

16. The method of claim 11 wherein providing the CDC service module includes implementing the CDC service module on the second message processor of the DRA.

17. The method of claim 11 comprising performing event monitoring for Internet protocol (IP) and non-IP traffic using Diameter signaling with Diameter network nodes.

18. The method of claim 17 wherein the event monitoring includes monitoring location and reachability for IP, non-IP, and SMS-connected devices.

19. The method of claim 11 comprising providing an IoT service module implemented by one of the message processors or by a computing platform separate from the DRA for providing SCS and AS services for at least some of the received messages.

20. A non-transitory computer readable medium having stored thereon executable instructions that when executed by the processor of a computer control the computer to perform steps comprising:
providing a DRA including a plurality of message processors, wherein the message processors include a first message processor comprising a printed circuit board, a processor, and a memory for implementing a Diameter connection layer (DCL) for establishing and maintaining Diameter connections with external Diameter nodes and a Diameter routing layer (DRL) for routing Diameter signaling messages based on Diameter layer information in the Diameter signaling messages; and
providing a cellular device connectivity (CDC) service module operatively associated with the DRA for providing SCEF services as a feature of the DRA, the SCEF services including determining whether to invoke Internet of things (IoT) service handling based on content of received messages and for forwarding messages requiring IoT service to a service capability server (SCS) or an application server (AS) for receiving the IoT service handling, wherein the DRA includes a second message processor comprising a printed circuit board, a processor, and a memory for implementing a CDC service interface to the CDC service module or for implementing the CDC service module, wherein the CDC service module is configured to function as a machine type communications interworking function (MTC-IWF).

* * * * *